United States Patent [19]

Borcherding et al.

[11] Patent Number: 5,303,369
[45] Date of Patent: Apr. 12, 1994

[54] SCHEDULING SYSTEM FOR MULTIPROCESSOR OPERATING SYSTEM

[75] Inventors: Mark A. Borcherding; J. Charles Kuhlman, both of Austin; Steve Schneider, Cedar Park, all of Tex.

[73] Assignee: Texas Instruments Incorporated, Dallas, Tex.

[21] Appl. No.: 576,300

[22] Filed: Aug. 31, 1990

[51] Int. Cl.$^5$ .......................... G06F 9/46; G06F 9/40
[52] U.S. Cl. .............................. 395/650; 364/DIG. 1; 364/281.3; 364/281.6; 364/281.7
[58] Field of Search ..................... 395/650; 364/281.3, 364/281.6, 281.7

[56] References Cited

U.S. PATENT DOCUMENTS 4,320,455  3/1982  Woods et al. .................. 364/200
4,855,903  8/1989  Carleton et al. ................ 364/200

FOREIGN PATENT DOCUMENTS 0346039  12/1989  European Pat. Off. ....... G06F 9/46

Primary Examiner—Gareth D. Shaw
Assistant Examiner—A. Katbab
Attorney, Agent, or Firm—Thomas G. Eschweiler; Robby T. Holland; Richard L. Donaldson

[57] ABSTRACT

A multiprocessor, multitasking digital processing system, having a host processor and a number of digital signal processors. Tasks are downloaded from the host processor to the digital signal processors, and are scheduled under the control of a scheduler program residing on the signal processors. Each task provides the scheduler with its processing characteristics, so that resources can be efficiently allocated according to the memory and processing requirements of the task.

7 Claims, 3 Drawing Sheets

SCHEDULING SYSTEM FOR MULTIPROCESSOR OPERATING SYSTEM

TECHNICAL FIELD OF THE INVENTION

This invention relates to computer systems, and more particularly to a method of scheduling tasks of a multiprocessor, multitasking system.

BACKGROUND OF THE INVENTION

Multiprocessing is a type of parallel processing that divides execution of separate programs among two or more processors. Multitasking is a special case of multiprocessing, which defines a software process, i.e., a task, to be a subprogram that may be executed simultaneously with other subprograms.

In a multitasking environment, the tasks and data structures of a job must be carefully partitioned to permit parallel execution without conflict. However, the availability of processors, the order of execution, and the completion of tasks are functions of run-time conditions of the system. Thus, multitasking is inherently nondeterministic with respect to time, although the tasks themselves may be well defined.

To ensure successful multitasking, once tasks have been partitioned, an operating system must be developed to provide efficient resource sharing. The assignment of resources to processes is referred to as "scheduling". Scheduling is especially important in systems that require real time response from real time input.

Most existing multitasking scheduling systems use a priority system, which is static in nature. The priority system does not account for a task's processing requirements, such as how long the task should take, how much memory it requires, or its memory needs in terms of time. The latter requirement is determined by how long the task can execute, using a given amount of memory, before it needs more memory.

Another approach to scheduling involves "time slicing", in which portions of a task are given a limited amount of time in which to execute. After this time, a portion of another task executes. Thus, if a task does not finish in its time, the processor is given to the next waiting task, and the unfinished task is rescheduled. A disadvantage of time sliced approaches is the overhead of context switching.

A need exists for a means of scheduling tasks so that resources are used efficiently without creating extra processing overhead.

SUMMARY OF THE INVENTION

One aspect of the invention is a method for scheduling tasks to be performed by processors of a multitasking, multiprocessor system. The processing characteristics, such as memory requirements and processor use, of the tasks to be performed are experimentally determined. Each task is related to a data structure that represents the processing characteristics of that task. At run time, tasks are called and are placed in a task queue. When a task is dequeued for execution, it informs a scheduler program of its processing characteristics. The scheduler then selects processing resources to be used by the task, in response to the task's processing characteristics and available resources.

A technical advantage of the invention is that real time response can be more easily maintained. Tasks are scheduled according to their processing needs, with the objective of permitting the task to run as long as it needs to run. The performance of a system can also be monitored to determine how loaded its resources are and whether it can support additional processing.

DETAILED DESCRIPTION OF THE INVENTION

Figure 1:
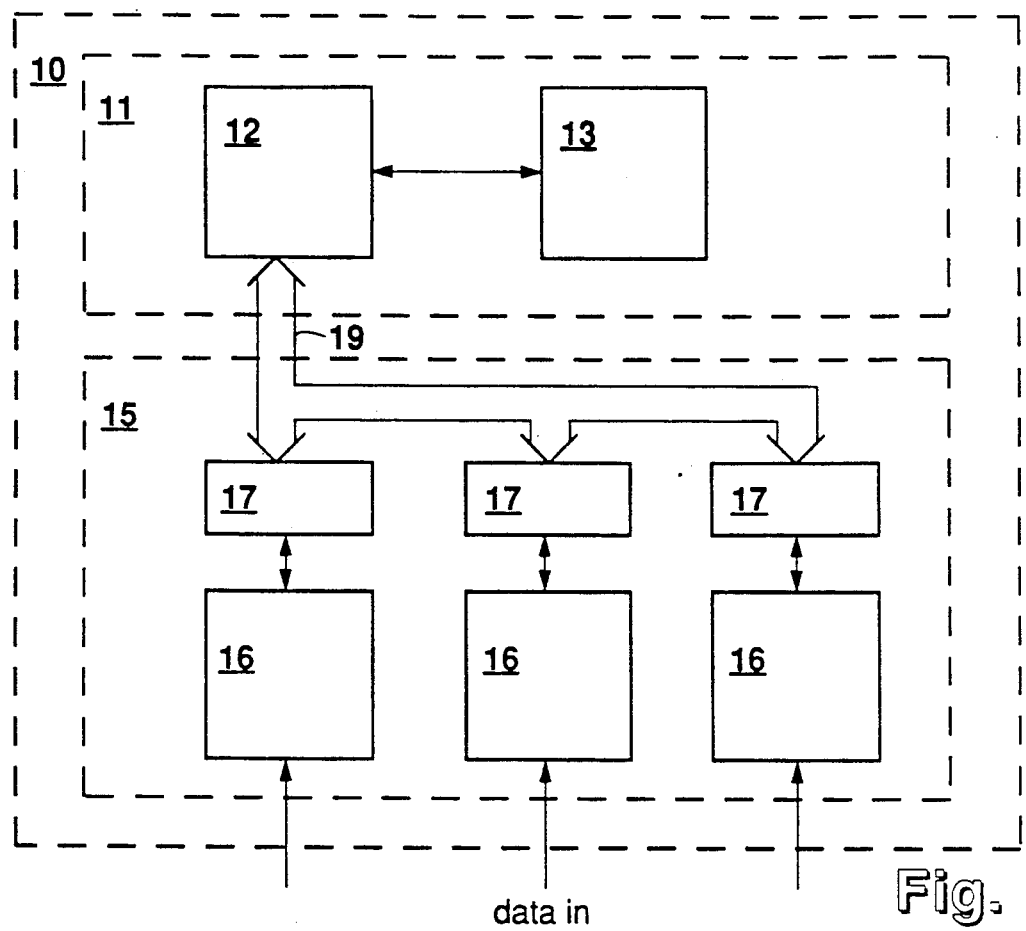
FIG. 1 is a block diagram of a multi-processor, multitasking computer processing system, having a host processor system in communication with a signal processor system.

FIG. 1 is a block diagram of a multiprocessor, multitasking computer processing system 10, having a host processor system in communication with a signal processor system 15. The communication means between processors 11 and 15 is a bus line 19, conforming to any one of a number of recognized standards for binary communications, such as the 32-bit NuBus standard. An advantage of the invention is that it is compatible with the simple, memory-mapped architecture of the NuBus standard.

Host processor system 11 includes a host processor 12 and memory 13. Host processor is typically a general purpose processor, for example the 68030 manufactured by Motorola Corporation. Memory 13 includes a program memory for storing instructions for host processor 12, as well as memory for storing program routines and parameters to be downloaded to signal processor system 15. The downloading process is further explained below.

Signal processor system 15 includes a number of signal processors 16 and a memory 17 associated with each. An example of signal processor 16 is the TMS 320C30, manufactured by Texas Instruments, Inc. A suitable size for memory 17 for the application described herein is 250 K×4 bytes. Signal processor system 15 executes program routines downloaded to it from host processor 12. When execution of one program routine is complete, signal processor system 15 notifies host processor 12, so that host processor 12 may download another routine.

Signal processors 16 are in communication with each other, which permits signal processor system 15 to perform more than one task simultaneously. For example, signal processor system 15 might be comprised of three signal processors 16, as in FIG. 1. Each signal processor 16 has its own memory 17, which is cross-coupled with a neighboring memory 17 to permit communications among signal processors 16.

Each signal processor 16 has a call handler, so that more than one incoming call may be simultaneously processed. The processing may be different for each call depending on the scripts delivered from host processor 12.

Figure 2:
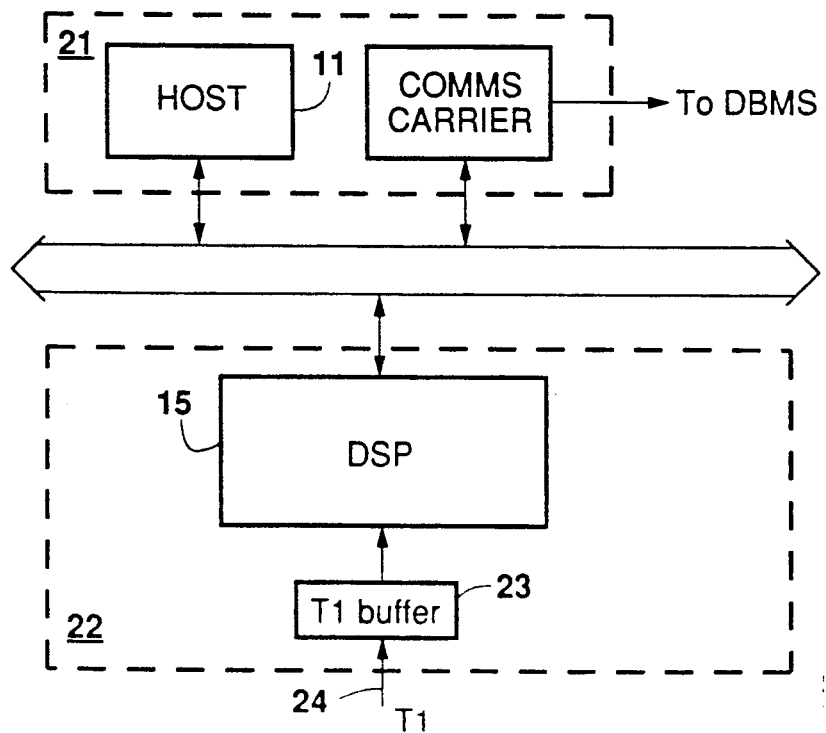
FIG. 2 is a block diagram illustrating a typical application of the multiprocessor system of FIG. 1, used for processing telephone communications.

FIG. 2 illustrates a typical application of multiprocessor system 10, used for processing telephone communications. In this application, host processor system 11 is part of a service control system 21, which handles a voice mail service. The service control system 21 also has a communications carrier and appropriate interfaces for communicating with a database management system (not shown), which maintains customer records and other information requiring a large database system. Service control system 21 is also in communication, via bus 19, with a telephony control system 22 that includes digital processing system 15. Via a T1 buffer 23, digital processing system 15 receives data from a T1 line 24 and performs the actual sending and receiving of voice data according to telecommunications protocols. An example of T1 buffer 23 is the Mitel MT8920 ST-bus parallel access circuit. As explained below in connection with FIG. 3, in practical applications of the invention, signal processing system 15 is a multi-processor, multi-tasking system, having a plurality of signal processors 16 and receiving input from multiple channels of the T1 line.

A more complete description of the use of multiprocessor system 10 for a voice mail application is set out in co-pending U.S. patent Ser. No. 570,171, entitled "Digital Signal Processing Control Method and Apparatus", also assigned to the assignee of the present invention. The method described herein is one method of transferring data within the multiprocessor environment of that invention. However, the method of the present invention is not limited to operation with that specific configuration, and as indicated by FIG. 1, could be used with any multiprocessor environment in which at least two processors share access to the memory of one processor.

The processing tasks of signal processing system 15, i.e., the functions to be performed by signal processor 16, are represented by portions of an application program loaded to host processor system 11. These portions of code are referred to herein as "scripts". Host processor 12 dynamically determines the specific sequence of tasks to be performed, and therefore determines the "script". The script is downloaded to signal processor 12 in a pseudo code form, and is interpreted by a script interpreter 32, shown in FIG. 3. The result is a set of byte codes that specify tasks that host processor 12 requires signal processor 16 to perform. The allocation of a task to a specific signal processor 16 capable of handling that task may be accomplished either by host processor 12 or script interpreter 32.

In the voice mail application, tasks are initiated by incoming calls. One example of a task is answering a telephone. Other tasks include listening to a message, recording a message, etc. In an application such as voice message processing, once the task of answering a telephone is performed, the tasks that follow vary according to caller input. For example, the caller may request to listen to messages, record messages, reach an operator, etc. Thus, in the voice message application, the script is the code that signal processor 16 will execute once a telephone is answered.

As an example of the operation of multitasking operation, a possible task is answering a telephone. Host driver 33 performs a compound read to receive the selection set, and host processor 12 delivers the region subset, including the script for this task, to signal processor 16. Each processor unit 16 capable of executing the task interprets the script and prepares to perform it. When a telephone rings, the first available processor 16 will answer the call. The next telephone ring will be processed by a second processor 16, etc.

Figure 3:
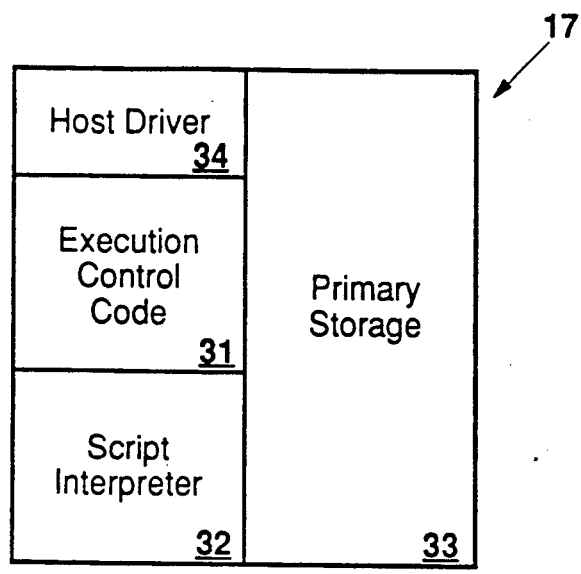
FIG. 3 is a functional block diagram of the program and data storage of each signal processor of FIG. 1.

FIG. 3 is a functional block diagram of the program and data storage of signal processor 16, as stored in memory 17. The programming has three main parts: an execution control section 31, a script interpreter section 32, and a host driver section 33. The execution control section 31 stores code executed by signal processor 16 and not changed by host processor 12. This code supports calls for specific functions from downloaded routines. For example, a downloaded routine might call a function "gentone (5)", which indicates that a DTMF signal corresponding to a keypad digit 5 is desired. Host driver 33 handles I/O to and from host processor 12, in a manner similar I/O handling by a standard device driver to and from a peripheral such as a disk drive. The script interpreter section 32 interprets scripts as explained above. As indicated in FIG. 3, memory 17 also has a primary storage area for storing program code and other data downloaded from host processor 12.

Host processor 12 and signal processor 16 are each capable of exclusive control over access to their respective memories 13 and 17. Thus, each processor 12 and 16 performs its own I/O operations.

Interprocessor communications, in particular downloading from host processor 12 to signal processor 16, is described in detail in co-pending patent application Ser. No. 576,258, entitled "Method for Communications Between Processors of a Multi-processor System", assigned to the assignee of the present invention. In brief, host processor 12 may specify by region, the data it desires to write to signal processor 16. Signal processor 16 performs a matching read operation to receive the region data. These matching write and read operations permit processes running on signal processor 16 to control access to a region exclusively of host processor 12. Allowing signal processor 16 to request a region before it can be delivered makes it impossible for host processor 12 to write to that region before signal processor 16 is finished accessing it.

Processing overhead is reduced by means of a "compound read" operation, using host driver 33. This operation requires an I/O operation only once per script, and permits signal processor 16 to receive all the regions it needs at once.

Apart from efficiency considerations of downloading data for specific tasks, task scheduling is also desireable for real time processing. A basic concept of the invention is assigning processing characteristics to each task, so that a scheduler can determine a schedule based on these characteristics. These characteristics include how long processing takes and how much memory is needed for processing.

One processing characteristic is a "real time" processor ratio, which is the processing time divided by the data time period. For example, assume data is read at 160 samples at Khz, for a total data time of 20 ms, and the processing time for that amount of data is 5ms. The processor ratio is 5/20=25%. If the task takes more than 5 ms plus a "slop factor", the processing is not considered real time. The required processing time for more or less data can be easily determined.

The following data structure is an example of the processing characteristics that might be claimed by a task, written for the C programming language:

```
Struct Task_Characteristics
{
        long task_type;
```

-continued
```
        long task_degrade_path;
        long task_time_max;
        long task_id:
        long buffer_size;
        long buffer_time;
        long average_execution_time;
        long total_execution_time;
        long minimum_execution_time;
        long maximum_execution_time;
        long number_executions;
        long number_alarms;
        long task_status;
}
```

The data items in this structure are described as follows:

| | |
|---|---|
| task_type | identifies the type of processing the task does, e.g., task_type = DTMF_RECEIVER. |
| task_degrade_path | indicates how to degrade to a less resource intensive task or alter the current task's processing to a less resource intensive operation. |
| task_time_max | indicates the maximum amount of time a task is allowed to run before an alarm is set off. |
| task_id | a number uniquely identifying this task from all other tasks. |
| buffer_size | defines the number of bytes in each of the tasks allocated buffers. |
| buffer_time | defines the amount of time represented by the data in the task buffers of buffer_size. |
| average_execution_time | statistic value indicating the average time this task takes to process a data buffer. |
| total_execution_time | statistic value indicating the total time this task has used processing data buffers. |
| minimum_execution_time | statistic value indicating the least amount of time used to process a data buffer. |
| maximum_execution_time | statistic value indicating the most amount of time used to process a data buffer. |
| number_executions | defines how many data buffers have been processed. |
| number_alarms | number of alarms that have occurred while this task has been executing. |
| task_status | current status of this task, e.g., TASK_OK ALARM_ON TASK_KILLED. |

A run-time scheduler is a part of the programming of each digital processor 16. This scheduler uses a task identifier, data representing the processing characteristics of a task, and availability of resources. Using this data, the scheduler allocates and deallocates resources dynamically during run time for each task. The processing characteristics are determined at initialization by being downloaded from host processor 12 or dynamically reconfigured, as explained below. Various enhancements of the invention include additional programming to handle a degradation process if the system becomes overloaded or to provide performance statistics.

During initialization of the signal processor system 15, data and stack space are allocated to those tasks that each processor 16 is to execute. These resource allocations are used by the scheduler during run time.

Figure 4:
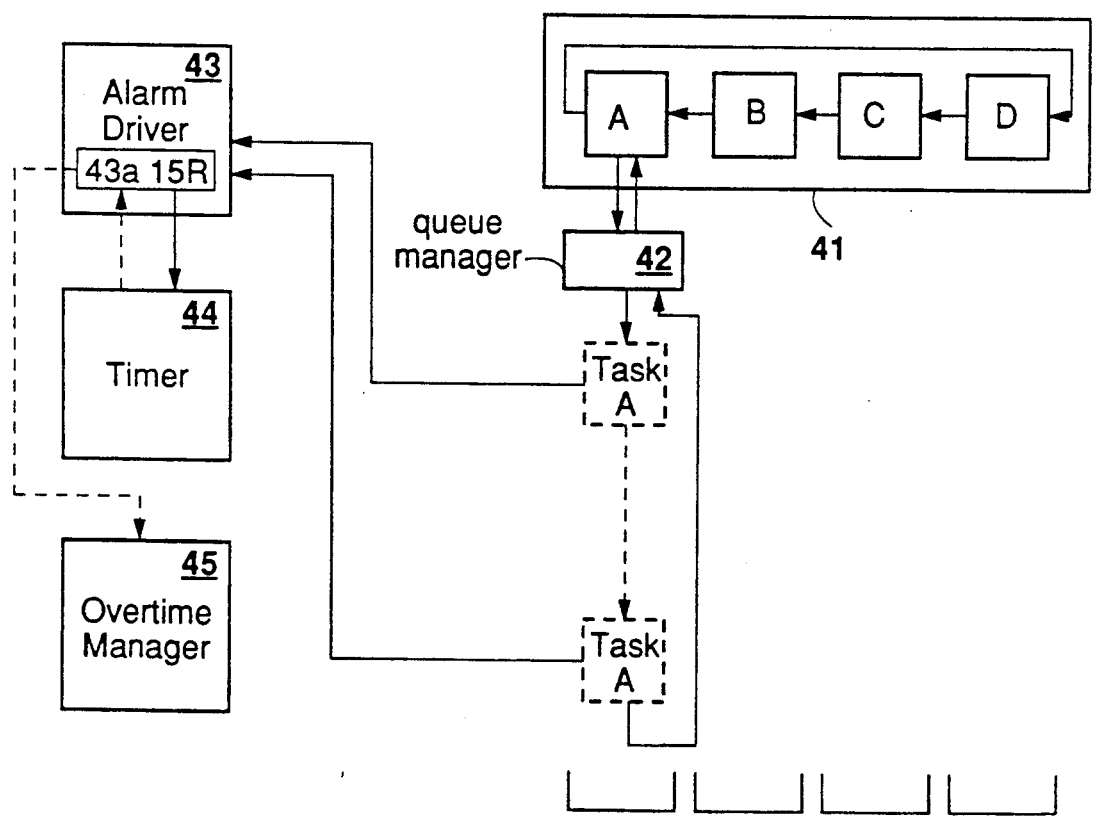
FIG. 4 is a diagram of the programming of the scheduling system for each signal processor of FIG. 1.
Figure 5:
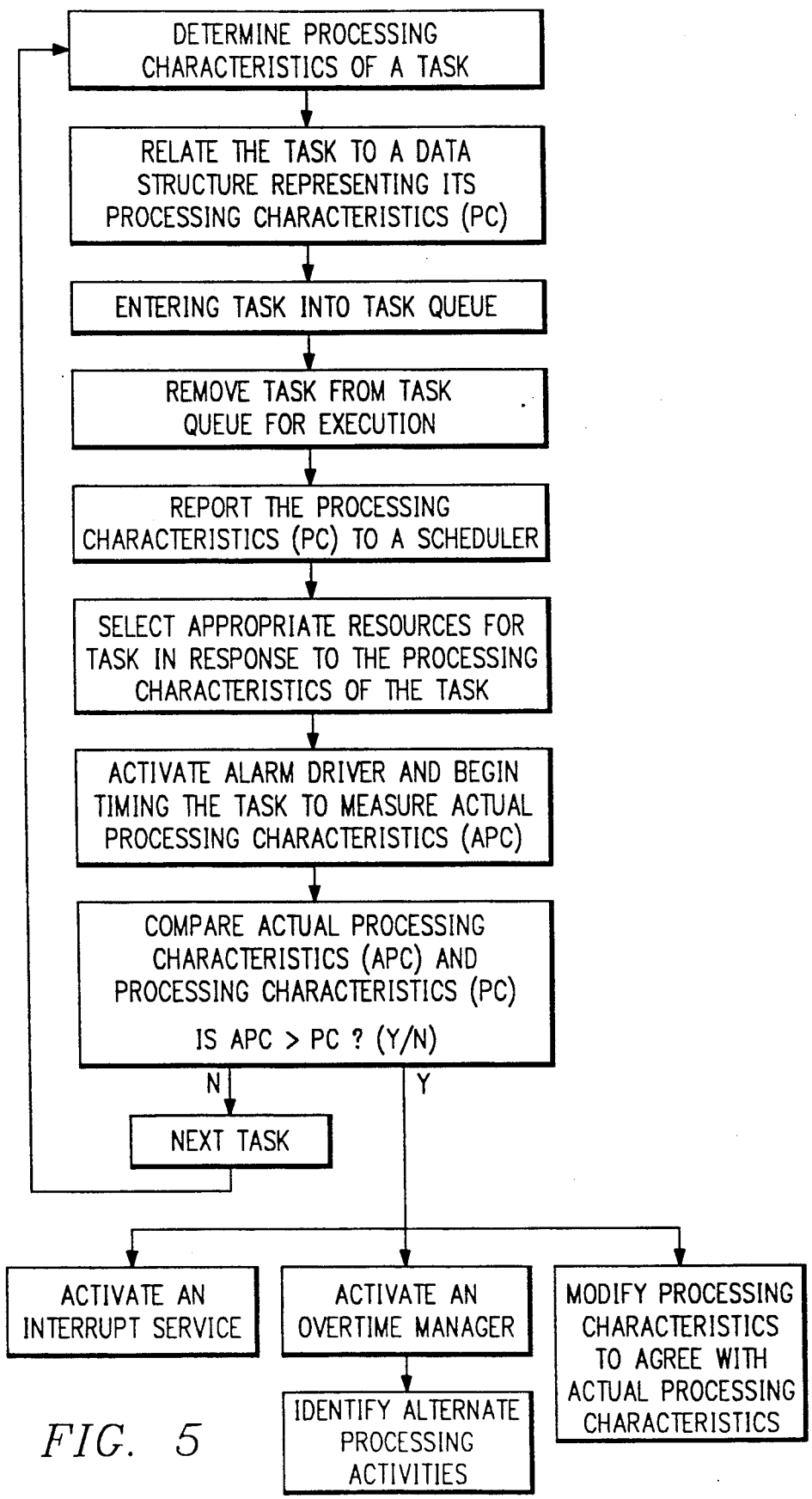
FIG. 5 is a block diagram illustrating the steps of the scheduling system.

FIG. 4 illustrates programming components of the scheduler, and the run time process of scheduling tasks. The main programming components of the scheduler are a task queue 41, a queue manager 42, an alarm driver 43, a timing generator 44, and an overtime manager 45.

Before processing begins, Tasks A-D are held in a task queue 41. A request for a task removes Task A from task queue 41 and delivers it to a queue manager 42.

Task A then provides queue manager 42 with its processing characteristics, which are referred to as the "claimed characteristics".

The next step for handling Task A is determined by its processing characteristics and the availability of system resources. Thus, depending on what processor 16, if any, is available and meets the requirements of Task A, the task is directed to it. Thus, queue manager 42 reads Task A's claimed processing characteristics and determines what resources, if any, are available. Depending on availability of resources that meet the requirements of Task A, scheduler 42 assigns Task A to a processor 16 for execution or delays execution.

When task A begins to run, it "punches in" to alarm driver 43, which performs the monitoring function discussed above. Timing generator 44 begins to time the processing of Task A. If Task A completes processing within its claimed time, it punches out and the alarm is turned off. Performance data may be collected and stored for Task A. The timer used by timing generator 44 may be any one of a number of well known hardware timing devices.

However, if Task A takes more than its claimed time, timing generator 44 sends an interrupt signal to processor 16. The interrupt signal activates an alarm service routine 43a, which sends an alarm signal to activate overtime manager 45.

Overtime manager 45 diagnoses the processing status of Task A to determine if a problem, such as memory corruption, an infinite loop, a deadlock, or a bad stack, is causing a delay. Overtime manager 45 also determines how to solve the delay, such as by rescheduling the task or by buffer manipulation. The overtime manager 45 also determines if the task simply provided the wrong expected execution time. The overtime manager 45 runs as a high priority task, activated by the alarm signal.

In the example set out above, if Task A takes more than 5 ms plus a small "slop" time factor, the alarm will activate. Overtime manager may alter the buffering strategy, stop Task A, or program Task A for a less time consuming algorithm, or perform some other management decision.

Providing overtime manager 45 with information about a task's processing characteristics also permits a task to be postponed. For example, providing the RAM requirements permits the buffer manipulation referred to above. In other words, the task may be postponed and its data buffered. Furthermore, because the RAM requirements are in terms of processor ratio times, overtime manager 45 knows how long the process will take for a given amount of data, as well as how much memory is needed.

Another feature of overtime manager 45 is that it provides a degradation scheme when a task is postponed. For example, overtime manager 45 can call for a task that is less intensive in terms of the processor ratio. This task can provide some alternative service to the user, and thereby avoid complete disruption of services. For example, an alternative service might be generating a busy signal.

The capability of the scheduler system to monitor the processing characteristics of tasks executed by digital processor 16 permits these characteristics to be dynamically modified during run time. Alternatively, these characteristics could be separately tested and provided to the system.

OTHER EMBODIMENTS

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A method for scheduling tasks to be performed by processors of a multi-tasking system, comprising the steps of:

running an application program that requires a plurality of tasks to be executed;

determining the processing characteristics of the plurality of tasks to be performed;

relating said plurality of tasks to a data structure representing said processing characteristics;

placing said plurality of tasks in a task queue;

dequeing a first task from the plurality of tasks for execution;

claiming said data structure representing processing characteristics of the first task to a schedular program;

selecting processing resources to be used for the first task, in response to said processing characteristics and available resources, using said scheduler program;

activating an alarm driver when said first task begins to use said processing resources and time said use to generate actual processing characteristics; and activating an overtime manager if said actual processing characteristics exceed a predetermined value wherein the overtime manager stops execution of the task, diagnoses a processing status of the first task to determine if a problem is causing a delay, determines how to solve the delay, and determines if processing characteristics are incorrect.

2. The method of claim 1, and further comprising the steps of:

activating an alarm driver when said first task begins to use said processing resources and of timing said use to generate actual processing characteristics;

comparing said processing characteristics to said actual processing characteristics;

activating an interrupt service if said actual processing characteristics exceed said processing characteristics by a predetermined value; and modifying said processing characteristics in response to said actual processing characteristics if an interrupt service is activated thus ensuring more accurate processing characteristics and thus improved scheduling accuracy.

3. The method of claim 2, wherein said processing characteristics further comprise a processor ratio, wherein the processor ratio is a processing time of the task divided by a data time period, and wherein a data time period is the total time data is read wherein the processor ratio provides an indication whether the processing of a task is fast enough to be considered real-time.

4. The method of claim 1, wherein said overtime manager determines alternate processing activities such as programming the task for a less time-consuming algorithm.

5. The method of claim 1 further comprising the steps of:

repeating the steps of dequeing a task, claiming processing characteristics, selecting processing resources, activating an alarm driver, and activating an overtime manager if actual processing characteristics exceed a predetermined value until all tasks have been executed.

6. The method of claim 1 further comprising the steps of:

activating the overtime manager if the actual processing characteristics exceed a predetermined value wherein the overtime manager postpones the task until resources become available for completion of the task.

7. The method of claim 1 further comprising the steps of:

degrading the processing characteristics of the task thus allowing the task to be executed by the available resources.

* * * * *